Feb. 24, 1970 H. A. BELL, JR 3,496,935
SUPPORT FOR LEGS
Filed Sept. 18, 1967

INVENTOR
Henry A. Bell, Jr.
BY
Jennings, Carter & Thompson
Attorneys

United States Patent Office 3,496,935
Patented Feb. 24, 1970

3,496,935
SUPPORT FOR LEGS
Henry A. Bell, Jr., Plateau, Ala., assignor to
Dewey L. Parmer, Plateau, Ala.
Filed Sept. 18, 1967, Ser. No. 668,511
Int. Cl. A61f *13/06, 5/37;* A01k *15/00*
U.S. Cl. 128—133                        5 Claims

ABSTRACT OF THE DISCLOSURE

Apparatus for supporting a pair of legs adjacent each other embodying a pair of adjustable members carrying depending side members at the outer ends thereof engageable with the sides of the legs to be supported. Locking means retains the adjustable members at selected positions relative to each other to make the overall length of the adjustable members at least as great as the distance across the legs to be supported.

---

This invention relates to a support for legs and more particularly to apparatus for supporting a pair of legs adjacent each other whereby the legs do not fall to uncomfortable positions in spaced relation to each other. My improved apparatus is particularly adapted for use by passengers in automobiles, trains, buses, aircraft and the like due to the fact that it permits the passenger to retain his legs in a comfortable and relaxed position without fear of the legs falling to positions which would be uncomfortable to himself or his fellow passengers. As is well known, it is very difficult for a person to retain his legs in an upright, relaxed position over a prolonged period of time due to the fact that the muscles in the legs must remain under constant strain in order to prevent the legs from falling one way or the other or apart. Accordingly, it is very difficult for passengers to relax or sleep unless some means is provided for supporting the legs to thus release all tension on the leg muscles.

To overcome the above and other difficulties, I provide apparatus for supporting a pair of legs adjacent each other which may be readily adjusted to accommodate the legs and one which conforms generally to the shape of the portion of the legs being confined by my improved apparatus, thus preventing excess pressures from being applied at any points of contact between the support and the legs being supported.

Apparatus embodying features of my invention is illustrated in the accompanying drawing, forming a part of this application, in which.

Figure 1:
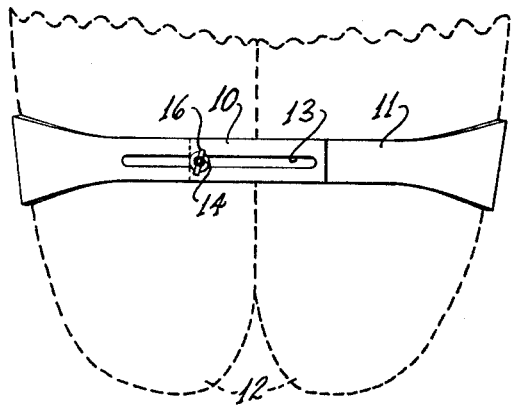
FIG. 1 is a top plan view showing the apparatus in use.

Referring now to the drawing for a better understanding of my invention, I show a pair of flat, horizontal support members 10 and 11 which are adapted for longitudinal movement relative to each other whereby the overall effective length of the support members 10 and 11 is sufficient to spand a pair of legs indicated generally at 12. An elongated slot 13 is provided in support member 10 for receiving an upstanding bolt 14 carried by the support member 11. A wing nut 16 is in threaded engagement with the bolt 14 whereby the elongated members 10 and 11 are locked at selected position relative to each other upon tightening the wing nut 16.

Figure 2:
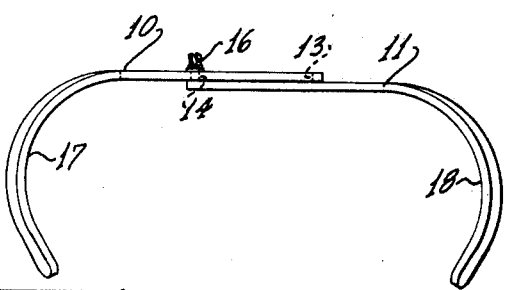
FIG. 2 is a front elevational view of the apparatus shown in FIG. 1, the legs being omitted for the sake of clarity.

Secured to the ends of the support members 10 and 11 are depending side members 17 and 18 which are of a size and shape corresponding generally to the adjacent portion of the legs 12 engaged by the depending side members. As shown in FIGS. 1 and 2, the forward edges of the depending side members 17 and 18 are closer to each other than the rearmost edges thereof. That is, the depending edges nearest the knees of the legs 12 are nearer to each other than the other depending edges thereof.

Figure 3:
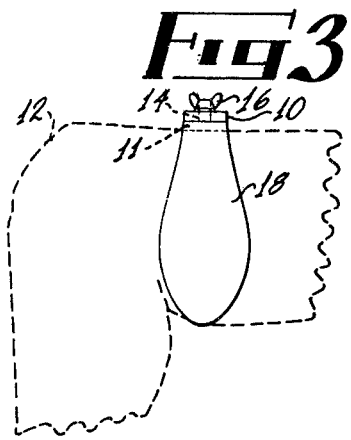
FIG. 3 is a side elevational view of the apparatus shown in FIGS. 1 and 2.
Figure 4:
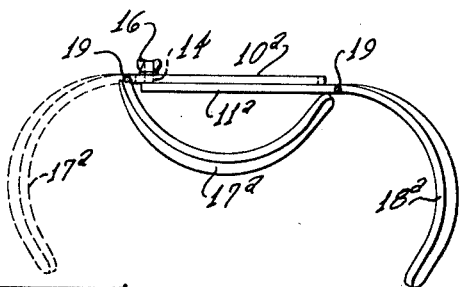
FIG. 4 is a front elevational view showing a modified form of my invention.

In FIG. 4 of the drawing, I show horizontal support members 10a and 11a which are adjustably connected to each other by a bolt 14 and wing nut 16 as described hereinabove relative to FIGS. 1 through 3. That is, an elongated slot is provided in the horizontal support member 11a for receiving the bolt 14. Instead of forming the depending side members integraly with the horizontal support members 10a and 11a, I provide depending side members 17a and 18a which are hingedly connected as at 19 to the outer ends of the horizontal support members 10a and 11a. The depending side members 17a and 18a are thus adapted to swing inwardly beneath the horizontal support members so as to form a compact unit when not in use. That is, the depending side members are adapted to move from an outer position indicated in dotted lines to the inner position assumed by depending side member 17a. Depending side member 18a is thus adapted to move inwardly with the inner surface thereof engaging the outer surface of depending member 17a.

Figure 5:
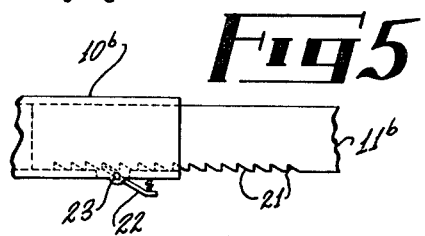
FIG. 5 is a fragmental view showing a modification of the means for holding the support members at selected positions relative to each other.

In FIG. 5 of the drawing I show a modified form of my invention in which horizontal support members 10b and 11b are telescopically connected to each other. A series of longitudinally spaced notches 21 are provided in the under surface of the horizontal support member 11b in position to receive a latch member 22 which is pivotally connected as at 23 to the horizontal support member 10b. The notches 21 slope outwardly toward the outer end of horizontal support member 11b while the inner edges of notches 21 extend generally perpendicular to the longitudinal axis of the support member 11b to thus restrain movement of the horizontal support members 10b and 11b in a direction outwardly of each other. On the other hand, the horizontal support members 10b and 11b may be moved inwardly for adjustment since the inner end of the latch member 22 is free to slide relative to the outwardly inclined surface of the notches 21.

Figure 6:
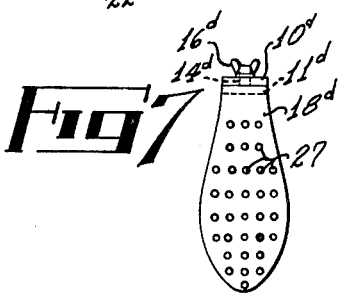
FIG. 6 is a further modification showing other means for holding the support members at selected positions relative to each other.

In FIG. 6 of the drawing, I show a further modified form of my invention in which I provide a horizontal support member 10c which is formed of a tubular material and is generally semi-cylindrical, as viewed in cross section. Telescoping within the horizontal support member 10c is a horizontal support member 11c which has an outer surface corresponding to the inner surface of the semi-cylindrical support member 10c. A plurality of longitudinally spaced recesses 24 are provided in the horizontal support member 11c for receiving the inner end of a set screw 26 which is in threaded engagement with a suitable opening provided through the horizontal support member 10c.

Figure 7:
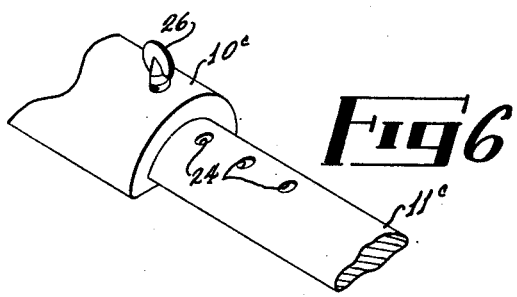
FIG. 7 is a side elevational view showing a still further modified form of my invention in which preforations are provided in the depending side members.

In FIG. 7 I show a still further modified form of my invention in which depending side members 18d are secured to the outer ends of horizontal support members 10d and 11d which are adjustably connected to each other by a bolt 14d and wing nut 16d. A plurality of openings 27 are provided through the depending side members 18b to provide perforated side members which permit ventilation.

From the foregoing description, the operation of my improved rest for a pair of legs will be readily understood. The horizontal members are positioned across the legs of the user, as shown in FIG. 1. The horizontal support members are then adjusted relative to each other whereby the depending side members engage the outer sides of the legs of the user. The horizontal support members are then locked to each other by tightening the wing nut 16. However, where the embodiments shown in FIGS. 5 and 6 are included, the horizontal support members are secured to each other by the latch member 22 or the set screw 26, as the case may be. With the depending side members in contact with the outer sides of the legs 12, the depending side members conform generally to the shape of the legs engaged thereby.

From the foregoing, it will be seen that I have devised an improved support for a pair of legs which retains the legs adjacent each other and in a comfortable position at all times. By providing depending side members which conform to the adjacent sides of the legs, there is no point at which excessive pressures are applied, thus adding further to the comfort of the user.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:
1. Apparatus for supporting a pair of legs adjacent each other comprising:
    (a) a pair of horizontal, flat support members adapted for longitudinal adjustment relative to each other,
    (b) means locking inner portions of said horizontal support members to each other at selected positions to make the overall effective length of said pair of horizontal support members at least as great as the distance across a pair of legs to be supported, and
    (c) a depending side member connected adjacent its upper end to the outer end of each of said horizontal support members and disposed to engage the outer side of a subjacent leg so that a pair of adjacent legs are confined between said depending side members.

2. Apparatus for supporting a pair of legs adjacent each other as defined in claim 1 in which each of said depending side members is of a shape corresponding generally to the shape of the side of the leg engaged by said depending side member.

3. Apparatus for supporting a pair of legs adjacent each other as defined in claim 1 in which the forward edges of said depending side members disposed nearest the knees of the pair of legs to be supported are nearer to each other than the other edges thereof.

4. Apparatus for supporting a pair of legs adjacent each other as defined in claim 1 in which the depending side members are hingedly connected to said horizontal support members.

5. Apparatus for supporting a pair of legs adjacent each other as defined in claim 1 in which said depending side members are perforated to provide ventilation openings therethrough.

References Cited
UNITED STATES PATENTS

| | | | |
|---|---|---|---|
| 2,895,471 | 7/1959 | Rollie | 128—133 |
| 3,153,412 | 10/1964 | Laubsch | 128—132 |
| 3,314,421 | 4/1967 | Wingard | 128—102 |

ADELE M. EAGER, Primary Examiner

U.S. Cl. X.R.
119—96; 128—134